(12) United States Patent
Hosein

(10) Patent No.: US 12,476,286 B2
(45) Date of Patent: Nov. 18, 2025

(54) RECHARGEABLE CALCIUM BATTERY

(71) Applicant: Ian Hosein, Minoa, NY (US)

(72) Inventor: Ian Hosein, Minoa, NY (US)

(73) Assignee: Syracuse University, Syracuse, NY (US)

( * ) Notice: Subject to any disclaimer, the term of this patent is extended or adjusted under 35 U.S.C. 154(b) by 594 days.

(21) Appl. No.: 17/723,677

(22) Filed: Apr. 19, 2022

(65) Prior Publication Data

US 2022/0336863 A1  Oct. 20, 2022

Related U.S. Application Data

(60) Provisional application No. 63/176,686, filed on Apr. 19, 2021.

(51) Int. Cl.
*H01M 10/26* (2006.01)
*H01M 4/36* (2006.01)
(Continued)

(52) U.S. Cl.
CPC ........... *H01M 10/26* (2013.01); *H01M 4/364* (2013.01); *H01M 4/381* (2013.01); *H01M 4/505* (2013.01);
(Continued)

(58) Field of Classification Search
CPC .............................. H01M 4/381; H01M 10/054
See application file for complete search history.

(56) References Cited

U.S. PATENT DOCUMENTS

2016/0315345 A1* 10/2016 Kim ..................... H01M 4/582
2016/0380268 A1* 12/2016 Bucur ................... H01M 4/602
429/218.1
(Continued)

FOREIGN PATENT DOCUMENTS

CN  111029579  *  4/2020

OTHER PUBLICATIONS

CN111029579 English translation. Tang et al. China. Apr. 17, 2020. (Year: 2020).*

*Primary Examiner* — Christopher P Domone
(74) *Attorney, Agent, or Firm* — David L. Nocilly; Bond Schoeneck & King PLLC

(57) ABSTRACT

A rechargeable calcium battery formed from a calcium metal anode, a cathode formed from a composite carbon/sulfur (C/S), a metal oxide, or a metal sulfide, and a multi-component electrolyte containing a mixture of different salts. The calcium anode is formed as a thin, pure calcium metal foil that is polished and combined with a copper collector for redox activity. The cathode may be formed from a carbon-sulfur (CS) composite or metal oxide/sulfide, such as $CaM_xO_y$ or $CaM_xS_y$, or formed from binary and ternary metals, such as $CaM1aM2bO_y/S_y$ and $CaM_{1a}M_{2b}M_{3c}O_y/S_y$. The battery also includes a multi-component electrolyte including calcium salts, such as $Ca(TSFI)_2$, $Ca(ClO_4)_2$, $Ca(BF_4)_2$, and $CaPF_6$, or the pairing of lithium, sodium and potassium salts with one of the anions, such as $Ca(TFSI)$, $NaPF_6$, and $Li(TFSI)$.

14 Claims, 3 Drawing Sheets

(51) Int. Cl.
*H01M 4/38* (2006.01)
*H01M 4/505* (2010.01)
*H01M 4/525* (2010.01)
*H01M 4/66* (2006.01)
*H01M 10/0568* (2010.01)
*H01M 10/0569* (2010.01)
*H01M 10/44* (2006.01)

(52) U.S. Cl.
CPC ........... *H01M 4/525* (2013.01); *H01M 4/661* (2013.01); *H01M 10/0568* (2013.01); *H01M 10/0569* (2013.01); *H01M 10/44* (2013.01)

(56) References Cited

U.S. PATENT DOCUMENTS

| | | | |
|---|---|---|---|
| 2017/0250438 A1* | 8/2017 | Barde | H01M 4/381 |
| 2018/0159177 A1* | 6/2018 | Tsujita | H01M 10/056 |
| 2018/0351165 A1* | 12/2018 | Barde | H01M 4/381 |
| 2021/0305577 A1* | 9/2021 | Gallant | H01M 4/628 |
| 2022/0013783 A1* | 1/2022 | Tanaami | H01M 10/0525 |
| 2024/0304787 A1* | 9/2024 | Lin | H01M 4/623 |

* cited by examiner

RECHARGEABLE CALCIUM BATTERY

CROSS-REFERENCE TO RELATED APPLICATIONS

The present application claims priority to U.S. Provisional Application No. 63/176,686 filed on Apr. 19, 2021.

BACKGROUND OF THE INVENTION

1. Field of the Invention

The present invention relates to rechargeable batteries and, more specifically to a calcium metal battery.

2. Description of the Related Art

Energy storage systems, such as rechargeable batteries, are a critical component of green energy conversion technologies, such as solar and wind power generation. Existing batteries that rely on rare elements, such as lithium, are expensive and thus cannot support the energy grid for less than $150 per kilowatt. Calcium presents an opportunity for use in a rechargeable battery as calcium can be provided at a lower cost, can be domestically sourced in the United States and is abundant globally, and is more environmentally sustainable that lithium. Calcium can also theoretically provide a similar storage capacity, energy density, and power output at a fraction of the cost of lithium, thereby providing a much better price to performance ratio. Accordingly, there is a need in the art for an approach that can use calcium in a rechargeable storage battery.

BRIEF SUMMARY OF THE INVENTION

The present invention is an electrochemical energy storage system based on a calcium metal battery. The rechargeable calcium battery comprises a calcium metal anode, a cathode formed from a composite carbon/sulfur (C/S) compound, a metal oxide, or a metal sulfide, and a multi-component electrolyte containing a mixture of different salts. The cathode may be formed from a carbon-sulfide composite, a metal oxide, a transition metal sulfide, a binary metal sulfide, and a ternary metal sulfide. The multi-component electrolyte may be an aprotic solvent and a cation salt selected from the group consisting of a calcium salt, a lithium salt, a sodium salt, or a potassium salt. The calcium metal foil may be polished. The calcium metal foil may be combined with a copper collector. The anode may be microporous or include a mesh support. The material forming the cathode may be of the formula $CaM_{1a}M_{2b}O_y/S_y$, $CaM_{1a}M_{2b}M_{3c}O_y/S_y$, or $CaNiMnCoO_2$. The cation salt may be a calcium salt such as $Ca(TSFI)_2$, $Ca(ClO_4)_2$, $Ca(BF_4)_2$, and $Ca(PF_6)_2$. The cation salt may be a combination calcium salt such as $Ca(trifluoromethanesulfonylimide)_2$, with non-calcium salts such as $NaPF_6$ or $Li(trifluoromethanesulfonylimide)$. The aprotic solvent may include ethyl carbonate, dimethyl carbonate, ethyl methyl carbonate, diethyl carbonate, acetonitrile, dimethyl fumarate, tetrahydrofuran. The aprotic solvent may be a binary mixture such ethyl carbonate/dimethyl carbonate, ethyl carbonate/ethyl methyl carbonate, ethyl carbonate/diethyl carbonate, and ethyl carbonate/propylene carbonate, or a ternary mixture such as ethyl carbonate/dimethyl carbonate/ethyl methyl carbonate. The aprotic solvent may also be an ionic liquid solvent selected from the group consisting of an alkyl imidazolium alkylsulfonate paired ionic liquid, 1-ethyl-3-methylimidazolium trifluoromethanesulfonate, 1-ethyl-3-methylimidazolium methanesulfonate, and 1-butyl-3-methylimidazolium trifluoromethanesulfonate.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
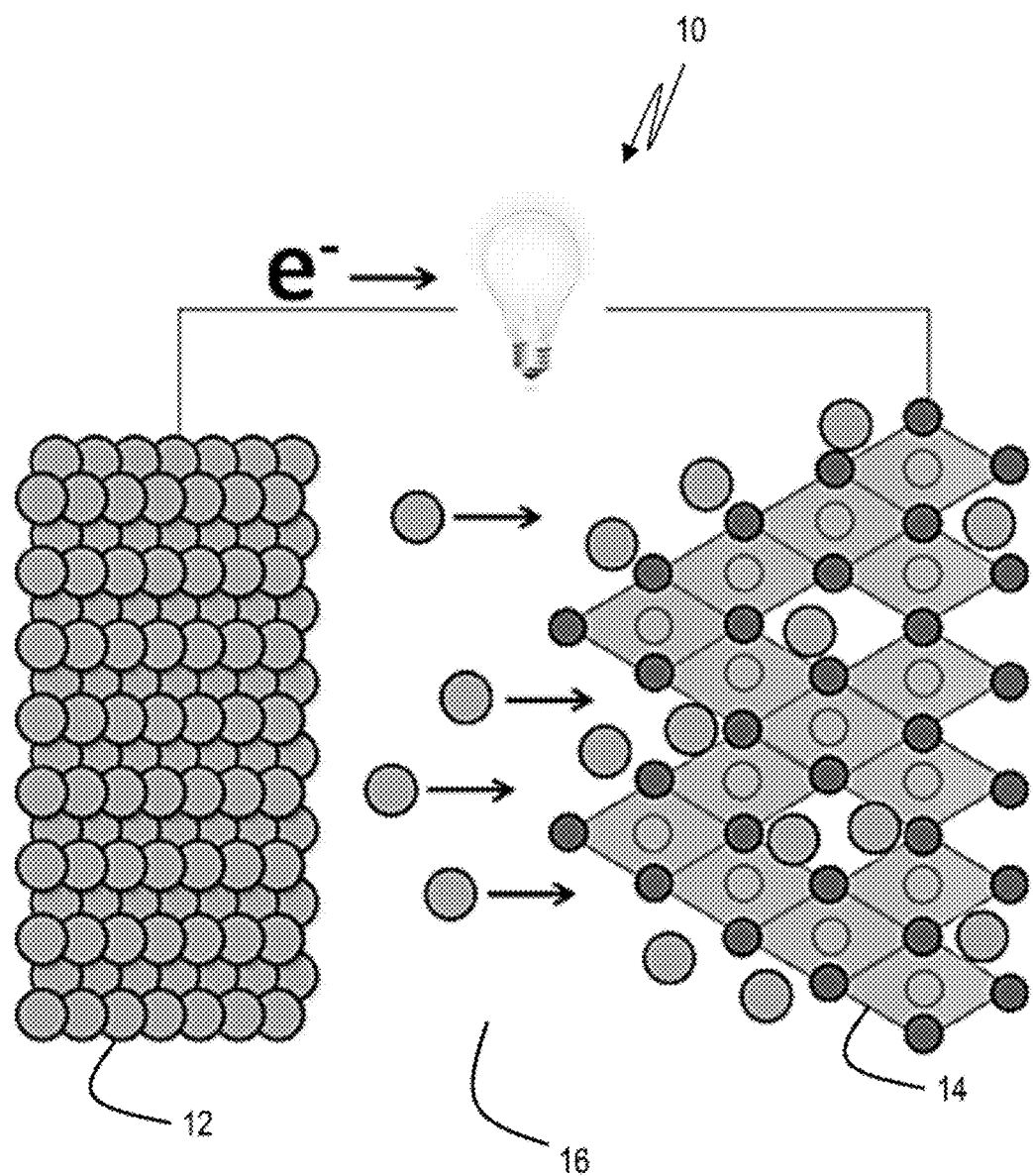
FIG. 1 is a schematic of a calcium battery according to the present invention.
Figure 2:
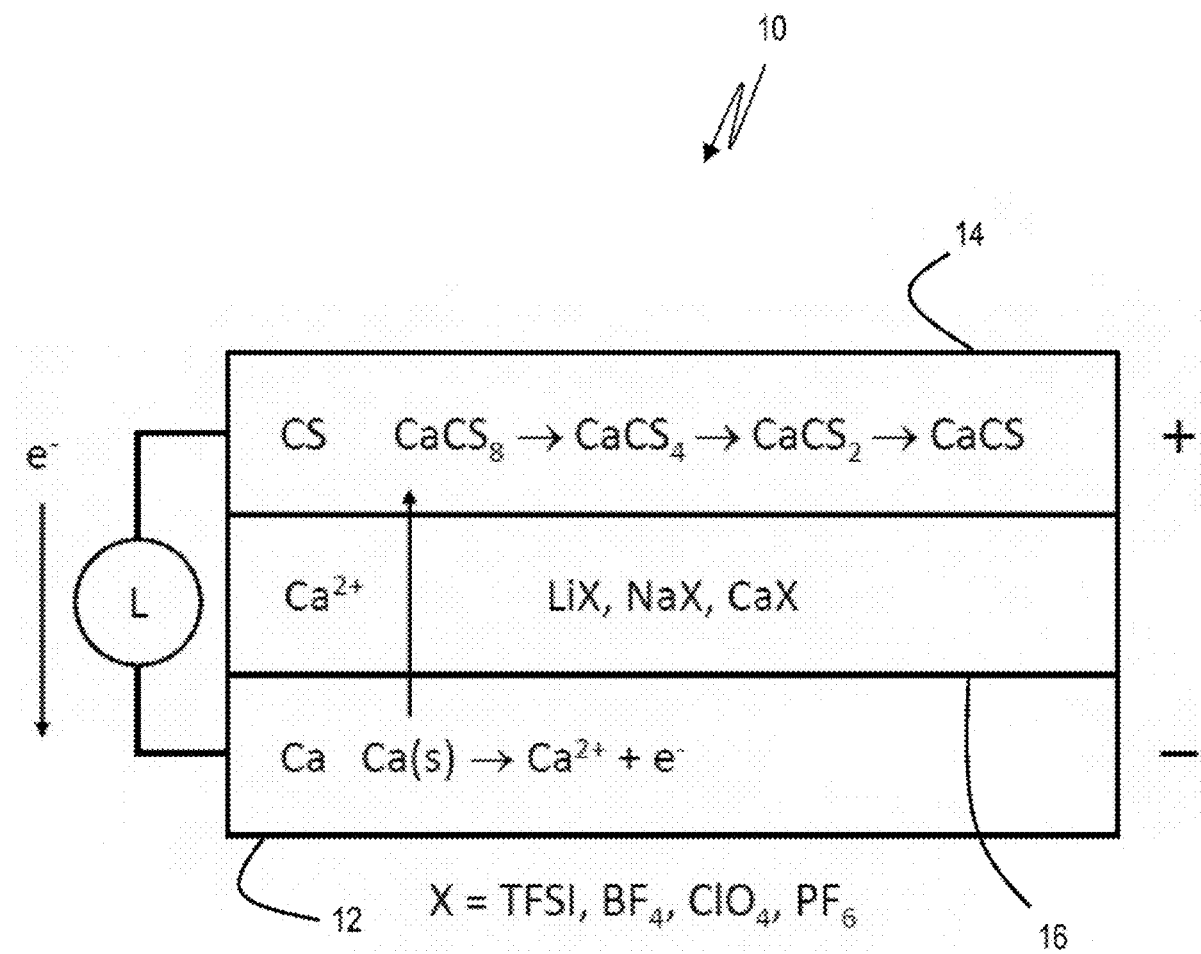
FIG. 2 is a diagram of a first embodiment of a calcium battery according to the present invention.
Figure 3:
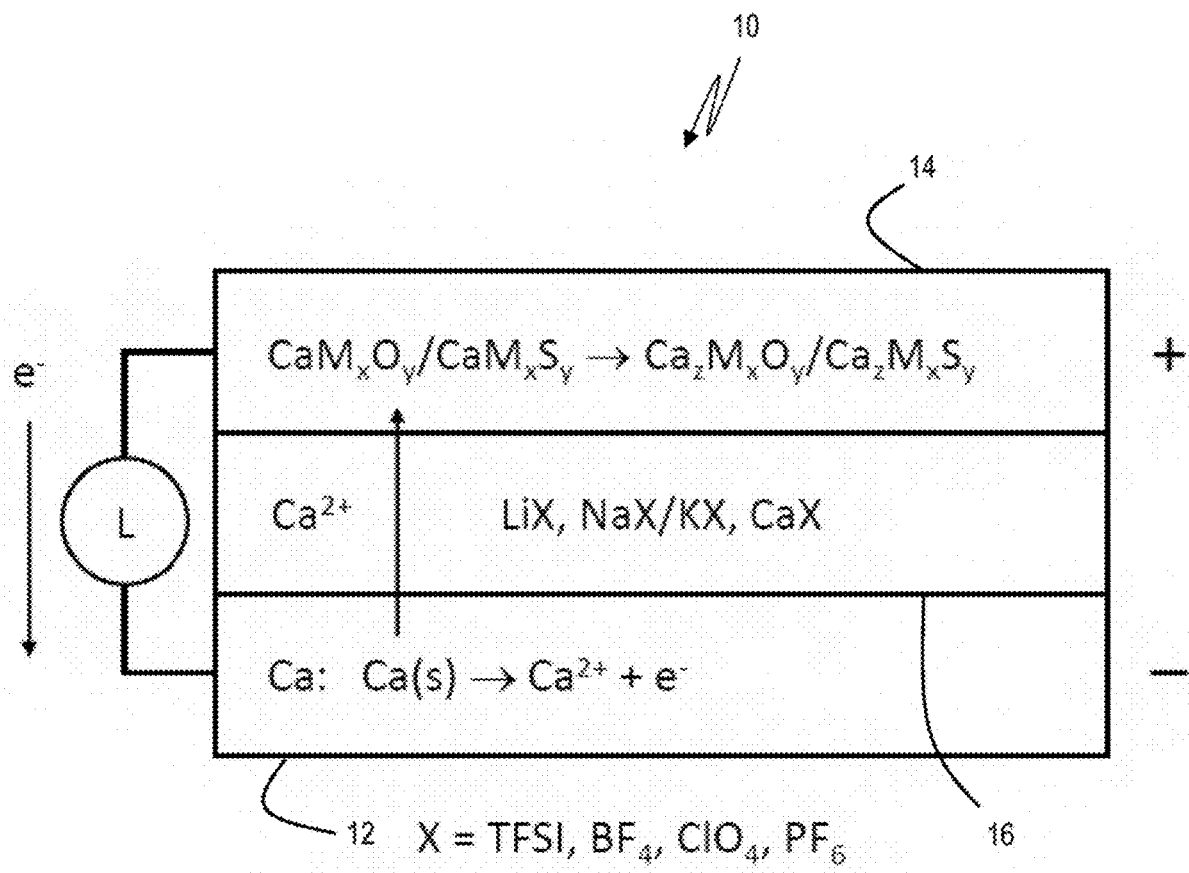
FIG. 3 is a diagram of a second embodiment of a calcium battery according to the present invention.

Referring to the figures, wherein like numeral refer to like parts throughout, there is seen in FIG. 1 a rechargeable calcium battery 10 according to the present invention. Battery 10 comprises a calcium metal anode 12, a composite carbon/sulfur cathode 14, and a multi-component electrolyte 16 containing a cation salt in an aprotic solvent. More specifically, as seen in FIG. 2, the cation salt may be selected from the group consisting of Li, Na/K, and Ca salts. Alternatively, as seen in FIG. 3, cathode 14 may be formed from a binary metal oxide or sulfide that contains calcium and another metal, such as CaMxOy or CaMxSy.

Calcium metal anode 12 is the electron source and is formed as a thin, pure calcium metal foil. The foil is polished to a high level of smoothness using a SiC rotatory brush to ensure maximal contact with the electrolyte. Foil is combined with a copper (Cu) collector, which provides stable redox activity and electrical contact. Stainless steel may also be used.

The calcium metal anode may also be in the form of a microporous structure, or calcium metal deposits on a carbon support, or calcium metal deposits on a stainless steel mesh support. This form of anode increases surface area to increase overall areal current density.

Referring to FIG. 2, in the first embodiment, cathode 14 formed from a carbon-sulfur (CS) composite or metal oxide/sulfide (CaMxOy/CaMxSy) cathodes enables high-capacity storage of calcium ions as well as fast charge/discharge of the battery via the fast mobility of Ca. The carbon stabilizes the sulfur materials to mitigate degradation of the cathode during cycling. In the example of binary metal oxide or sulfide for cathode 14, the metal center can be any transition metal element, such as Ti, V, Cr, Mn, Fe, Co. Specific ratios for x/y are 1/3 and 2/4, with the former being a perovskite crystal structure and the latter being either of the spinel and post-spinel compounds.

Referring to FIG. 3, in another embodiment, cathode 14 comprises the use of binary and ternary transition metal compositions, such as $CaM_{1a}M_{2b}O_y/S_y$ and $CaM_{1a}M_{2b}M_{3c}O_y/S_y$. Another variation to the $CaM_xO_y/CaM_xS_y$ are materials with layered structure, such as $CaNiMnCoO_2$, as well as binary layered oxides selected from Ni, Mn, and Co. Different stochiometric ratios may be selected. Switching S for O, allows for tuning of the ion transport and charge/discharge kinetics. Specifically, perovskite ($CaMO_3$) and spinel or post-spinel ($CaM_2O_4$) structures may be used. Both binary and ternary transitional metal oxides may be in the perovskite, spinel, post-spinel, or layer crystal structures.

In either embodiment, multi-component electrolyte 16 is selected to ensure stable cycling at high kinetics rates. Calcium salts that may be used are $Ca(TSFI)_2$, $Ca(ClO_4)_2$, $Ca(BF_4)_2$, and $Ca(PF_6)_2$. Lithium, sodium and potassium salts may also be paired with one of these anions. As an example, the present invention may comprise Ca(TFSI), $NaPF_6$, and Li(TFSI), where TFSI is trifluoromethanesulfonylimide. Multi-component electrolyte 16 is configured to enable several key functions. First, multi-component electrolyte 16 provides an increased mobility of $Ca^{2+}$ ions via the Li salt to increase coordination with the electrolyte solvent and reduce coordination with Ca, thereby allowing the former greater mobility. Second, multi-component electrolyte 16 provides for the formation of a stable solid electrolyte interface via Na and/or K salts, which creates a protective layer over the calcium metal and has high transport coefficients for $Ca^{2+}$ ions. Na and K are selected because they form a stable artificial solid electrolyte interface over the calcium anode to allow for stable redox activity and high calcium ion transport. Finally, multi-component electrolyte 16 facilitates battery charge transport via the native calcium salt. Multi-component electrolyte 16 may also comprise a variation where any of the salt components for their respective cation is also binary (CaX and CaY). In this option, the salt components further stabilize the electrodes and the respective cations enable charge transport. The solvent used for multi-component electrolyte 16 may comprise carbonate electrolytes, either as single components, binary, or ternary components. Examples include (single:) EC (ethyl carbonate), DMC (dimethyl carbonate), EMC (ethyl methyl carbonate), DEC (diethyl carbonate), ACN (acetonitrile), DMF (dimethyl fumarate), THE (tetrahydrofuran), (binary:) EC/DMC, EC/EMC, EC/DEC, and EC/PC (propylene carbonate), and (ternary:) EC/DMC/EMC. An additional variation of the solvent for the present invention comprises the use of ionic liquid solvents, such as alkyl imidazolium alkylsulfonate paired ionic liquids. Other examples include 1-ethyl-3-methylimidazolium trifluoromethanesulfonate, 1-ethyl-3-methylimidazolium methanesulfonate, and 1-butyl-3-methylimidazolium trifluoromethanesulfonate.

Battery 10 may further include a separator such as a standard separator formed from plastic or glass. Additionally, the separator may be a low ether content, crosslinked polymer gel, in which the electrolytes are swollen. The low ether content enables greater mobility in of the cations in the electrolyte, and can also help further stabilize the calcium metal anode interface. Examples include polytetrahydrofuran, but other low ether content polymers are acceptable. Polyethylene oxide is also acceptable.

Battery 10 enables a high discharge rate and stable long-life cycling. Based on the chemistry of the present invention, battery 10 has theoretical energy densities of 900 Wh/kg and theoretical capacities of 750 mAh/g, which have been at least partially confirmed with experimentation. Battery can provide open circuit voltages that range from 2.5 and 4 V.

What is claimed is:

1. A rechargeable battery, comprising: an anode formed from a polished calcium metal foil;
   a cathode formed from a material selected from the group consisting of a carbon-sulfide composite, a metal oxide, a transition metal oxide or sulfide, a binary metal oxide or sulfide, and a ternary metal oxide sulfide; and
   an electrolyte comprising an aprotic solvent and a cation salt selected from the group consisting of a calcium salt, a lithium salt, a sodium salt, or a potassium salt.

2. The rechargeable battery of claim 1, further comprising a copper collector.

3. The rechargeable battery of claim 2, wherein the anode is microporous.

4. The rechargeable battery of claim 2, wherein the anode includes a mesh support.

5. The rechargeable battery of claim 1, wherein the material forming the cathode is $CaM_{1a}M_{2b}O_y/S_y$, wherein $M_{1a}$ is a first transition metal and $M_{2b}$ is a second transition metal and a, b, and y represent stoichiometric coefficients.

6. The rechargeable battery of claim 1, wherein the material forming the cathode is $CaM_{1a}M_{2b}M_{3c}O_y/S_y$, wherein $M_{1a}$ is a first transition metal, $M_{2b}$ is a second transition metal and $M_{3c}$ is a third transition metal and a, b, c, and y represent stoichiometric coefficients.

7. The rechargeable battery of claim 1, wherein the material forming the cathode is $CaNiMnCoO_2$.

8. The rechargeable battery of claim 1, wherein the calcium salt is selected from the group consisting of $Ca(TSFI)_2$, $Ca(ClO_4)_2$, $Ca(BF_4)_2$, and $CaPF_6$.

9. The rechargeable battery of claim 1, wherein the calcium salt is selected from the group consisting of Ca(trifluoromethanesulfonylimide)$_2$, $NaPF_6$, and Li(trifluoromethanesulfonylimide).

10. The rechargeable battery of claim 1, wherein the aprotic solvent is a carbonate.

11. The rechargeable battery of claim 1, wherein the aprotic solvent is selected from the group consisting of ethyl carbonate, dimethyl carbonate, ethyl methyl carbonate, diethyl carbonate, acetonitrile, dimethyl fumarate, tetrahydrofuran.

12. The rechargeable battery of claim 10, wherein the aprotic solvent is a binary compound selected from the group consisting of ethyl carbonate/dimethyl carbonate, ethyl carbonate/ethyl methyl carbonate, ethyl carbonate/diethyl carbonate, and ethyl carbonate/propylene carbonate.

13. The rechargeable battery of claim 10, wherein the aprotic solvent is ethyl carbonate/dimethyl carbonate/ethyl methyl carbonate.

14. The rechargeable battery of claim 1, wherein the aprotic solvent is an ionic liquid solvent selected from the group consisting of an alkyl imidazolium alkylsulfonate paired ionic liquid, 1-ethyl-3-methylimidazolium trifluoromethanesulfonate, 1-ethyl-3-methylimidazolium methanesulfonate, and 1-butyl-3-methylimidazolium trifluoromethanesulfonate.

\* \* \* \* \*